US012715533B2

(12) United States Patent
Kunert

(10) Patent No.: US 12,715,533 B2
(45) Date of Patent: Aug. 25, 2026

(54) LOCKING DEVICE FOR FASTENING A BATTERY TO A FRAME OF A BICYCLE

(71) Applicant: Robert Bosch GmbH, Stuttgart (DE)

(72) Inventor: Peter Kunert, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 814 days.

(21) Appl. No.: 17/997,401

(22) PCT Filed: Jun. 23, 2021

(86) PCT No.: PCT/EP2021/067145
§ 371 (c)(1), (2) Date: Oct. 28, 2022

(87) PCT Pub. No.: WO2022/028770
PCT Pub. Date: Feb. 10, 2022

(65) Prior Publication Data

US 2023/0242202 A1 Aug. 3, 2023

(30) Foreign Application Priority Data

Aug. 6, 2020 (DE) ..................... 10 2020 209 928.6

(51) Int. Cl.
*B62J 43/20* (2020.01)
*B62M 6/90* (2010.01)

(52) U.S. Cl.
CPC ................ *B62J 43/20* (2020.02); *B62M 6/90* (2013.01)

(58) Field of Classification Search
CPC ................................. B62J 43/20; B62M 6/90
See application file for complete search history.

(56) References Cited

U.S. PATENT DOCUMENTS 9,399,499 B2 * 7/2016 Honda ..................... B62M 6/90
10,183,591 B2 * 1/2019 Shieh ..................... B62K 19/40
11,535,331 B2 * 12/2022 Lee ......................... B62M 6/90
2022/0281554 A1 * 9/2022 Philipzik ................ B60L 50/20

FOREIGN PATENT DOCUMENTS

DE 102016213903 B3 1/2018
DE 102019204013 A1 10/2019
DE 102019203541 B3 6/2020
EP 3570389 A1 11/2019
WO 2005016696 A1 2/2005

OTHER PUBLICATIONS

International Search Report for PCT/EP2021/067145, Issued Oct. 8, 2021.

* cited by examiner

*Primary Examiner* — Valentin Neacsu
*Assistant Examiner* — Marlon A Arce
(74) *Attorney, Agent, or Firm* — NORTON ROSE FULBRIGHT US LLP

(57) ABSTRACT

A locking device for fastening an electrical energy store to a frame tube or the like of a two-wheeled vehicle. The locking device includes a lever system having a base plate the lever, and a shifting link between the base plate and the lever, the shifting link having a first bearing axis and a second bearing axis as well as a first curved track and a second curved track, the lever being developed to pivot about the base plate with the aid of the shifting link in such a way that the lever executes a first pivoting motion solely about the first bearing axis and subsequently performs a second pivoting motion solely about the second bearing axis.

15 Claims, 3 Drawing Sheets

1
3
4
20
2

4
40
41
9
42
41a
61a
41b
63
65
61
61a
62a
6
64
6
62
7

41
3
43
R2
A
63a
91
9
61
63
90
7
64
62
65
R1
42
D
20
21
22

41
40
3
43
E
61
63
9
90
64
65
62
42

LOCKING DEVICE FOR FASTENING A BATTERY TO A FRAME OF A BICYCLE

FIELD

The present invention relates to a locking device for fastening an electrical energy store to a frame or a similar element of a bicycle, in particular a bicycle equipped with an electric drive such as an e-bike or a pedelec. In addition, the present invention relates to an electrical energy store having such a locking device and to a bicycle, in particular a bicycle having an electric drive, including such a locking device.

In particular, the present invention relates to two-wheeled vehicles on a bicycle basis, especially so-called pedelecs or e-bikes, in which in addition to a drive based on muscular energy, an electric drive can also become active in an assisting and/or exclusive manner.

BACKGROUND INFORMATION

In such bicycle-based two-wheeled vehicles, the electrical energy store can often be removed to make it possible for the electrical energy store to be recharged separately from the two-wheeled vehicle. For better optics, electrical energy stores are frequently integrated directly into a frame of a two-wheeled vehicle. This often requires very large frame cutouts which have a negative effect on the stiffness of the frame. Because of the better stiffness conditions, it was suggested to insert the electrical energy stores into a frame tube from above or below and to fix them in place in the inserted position. Clamping levers, for example, may be used for the fixation. Because of the positioning and the length of the electrical energy stores, collisions with other components of the two-wheeled vehicle can often occur in the process.

SUMMARY

A locking device according to the present invention for fastening an electrical energy store to a frame or a similar element of a two-wheeled vehicle may have the advantage that a combined rotary and tilting motion is possible so that a required pivoting range for a lever of the locking device can be kept very small. This allows for considerably better handling during the removal and reinsertion of the electrical energy store into the frame. If the electrical energy store is disposed in a frame tube of a two-wheeled bicycle, for example, the small handling radius of the locking device according to the present invention therefore makes it possible to enlarge a frame tube length that can be used for the electrical energy store, which means, for instance, that an energy store having a larger capacity can be installed or the energy store be given a flatter design.

According to the present invention, this is achieved in that the locking device includes a lever system, which has a base plate, a lever, and a shifting link between the base plate and the lever. According to an example embodiment of the present invention, the shifting link has a first and a second bearing point and also a first and second curved track. A bearing point is in an operative connection with one of the curved tracks in each case. The lever is designed to pivot on the base plate with the aid of the shifting link so that the lever executes a first pivoting motion solely about the first bearing point and subsequently executes a second pivoting motion solely about the second bearing point. A type of series connection of the two pivoting motions is achieved as a result, that is, solely about the first bearing point at the outset and then solely about the second bearing point. Simultaneous pivoting about both bearing points is therefore impossible and a serial pivoting motion occurs instead. A movement of the lever relative to the base plate may thus be achieved with a considerably reduced pivoting range, and a collision risk of the lever with other components of the two-wheeled vehicle during the pivoting motion is minimized.

Preferred refinements of the present invention are disclosed herein.

In addition, the first curved track and/or the second curved track preferably is/are an uninterrupted curve in each case. The uninterrupted curve preferably has a constant radius.

Most preferably, a radius of the first and the second curve path is identical. This allows for an easily calculable path characteristic of the pivoting motion of the lever relative to the base plate. An especially compact positioning between the base plate and lever is achieved if a clearance between the first and the second bearing point preferably has the same length as a radius of the first and second curved track. This results in a minimal envelope curve of the pivoting motion of the lever at the base plate.

According to a preferred embodiment of the present invention, the first curved track has a first end stop. The end stop, for instance, is defined by an end region of the curved track introduced into a surface of the base plate or the lever. Moreover, the second curved track preferably has a second end stop.

To allow for a simple release of the lever from the base plate, the first and second curved tracks are positioned in such a way that they intersect at a point of intersection. Particularly preferably, an opening is provided on a side of the curved track at the point of intersection of the first and second curved track, which means that the lever can easily be pulled out of the shifting link.

Moreover, a length of the first curved track preferably equals a length of the second curved track. In this way, the pivoting motions about the first and second bearing points may have the same length.

According to a further preferred embodiment of the present invention, the locking device also includes a safety element. In the locked state of the locking device, the safety element is designed to fasten the locking device to a frame or the like of a two-wheeled vehicle. The safety element may preferably be a hook or a similar element. In addition, the safety element is preferably positioned next to one of the bearing points. According to a particularly preferred embodiment of the present invention, the safety element is positioned on the lever in such a way that it can be removed. As a result, a development of the locking device may be such that a further pivoting motion of the lever is enabled by releasing and removing the safety element.

The base plate especially preferably has a stop, which restricts a maximum pivoting motion of the lever. When the stop of the base plate engages with the removable safety element, an additional, further pivoting travel of the lever is enabled, which, for instance, allows for a complete separation of the lever from the base plate, for example by removing the safety element from the lever. This may be useful for cleaning purposes, for instance. As a result, the safety element may preferably be used as a stopping element at the stop of the base plate and allow for a simple, complete deinstallation of the locking device by removing the safety element.

The first and second bearing points are preferably situated on the base plate, and the first and second curved tracks are preferably situated on the lever. As an alternative, the first and second bearing points are situated on the lever, and the first and second curved tracks are situated on the base plate. In both alternatives, it is preferred that the curved tracks be developed as grooves and the bearing points preferably be developed as cylinders. The curved tracks and the bearing points are preferably produced in one piece with the respective component, for instance from a plastic material or a metal material.

Moreover, the curved tracks and bearing points are preferably implemented in duplicate on the locking device, e.g., on two opposite sides of the locking device.

According to a further preferred embodiment of the present invention, the locking device also includes a latching device for the reversible latching of the lever on the base plate. The latching connection may be preloaded with the aid of a spring element, for example, and be disengaged by a tilting motion at an undercut, for instance. The latching is preferably implemented via a ramp or the like and in an automated manner when resetting the lever.

The locking device furthermore includes a lock to prevent an unauthorized opening of the locking device. As a result, the lever of the lever system can be pivoted only after opening the lock.

Moreover, the locking device preferably includes a fastening device, which is developed on the base plate and designed to retain the base plate in position on an electrical energy store.

The fastening device may include through holes and threaded bolts or the like, for example.

The locking device is preferably a component that can be handled separately. As an alternative, the base plate can also be an integral part of a housing of the electrical energy store. After the locking device has been opened, it may then be removed from a frame or similar element together with the electrical energy store.

In addition, the present invention relates to an energy store, which includes a locking device according to the present invention.

Moreover, the present invention pertains to a two-wheeled vehicle, in particular a bicycle able to be driven using muscular energy and/or using an electric drive, which includes an electrical energy store and a locking device according to the present invention. The electrical energy store is preferably integrated into a frame part of the two-wheeled vehicle, and the locking device holds the electrical energy store in position without additional movable elements.

BRIEF DESCRIPTION OF THE DRAWINGS

Below, a preferred exemplary embodiment of the present invention is described in detail with reference to the figures.

DETAILED DESCRIPTION OF EXAMPLE EMBODIMENTS

In the following text, a two-wheeled vehicle 1 having a locking device 4 according to a preferred exemplary embodiment of the present invention will be described in detail with reference to FIGS. 1 through 6.

It should be noted that a two-wheeled vehicle is particularly understood as a bicycle equipped with an electric drive, e.g., a pedelec, in which the electric drive is connected only if a driver is operating the pedals, or as an electric bicycle which allows for an operation of the electric drive even without any pedaling.

Figure 1:
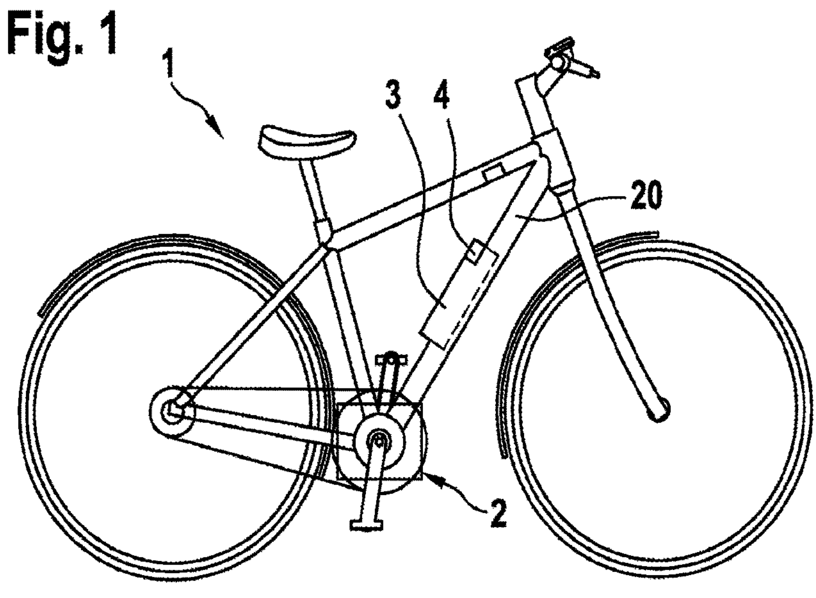
FIG. 1 shows a schematic view of a two-wheeled vehicle having an electric drive according to a preferred exemplary embodiment of the present invention.

As may be gathered from FIG. 1, an electric drive 2 is situated in the region of a bottom bracket of the two-wheeled vehicle embodied as a bicycle. In addition, two-wheeled vehicle 1 includes an electrical energy store 3, which is at least partly integrated into a frame tube 20. A locking device 4, which securely locks electrical energy store 3 on frame tube 20, is situated in an end region of electrical energy store 3. Electrical energy store 3 is able to be removed from frame tube 20 by unlocking locking device 4.

Locking device 4 may be gathered in detail from FIGS. 2 through 6.

Figure 2:
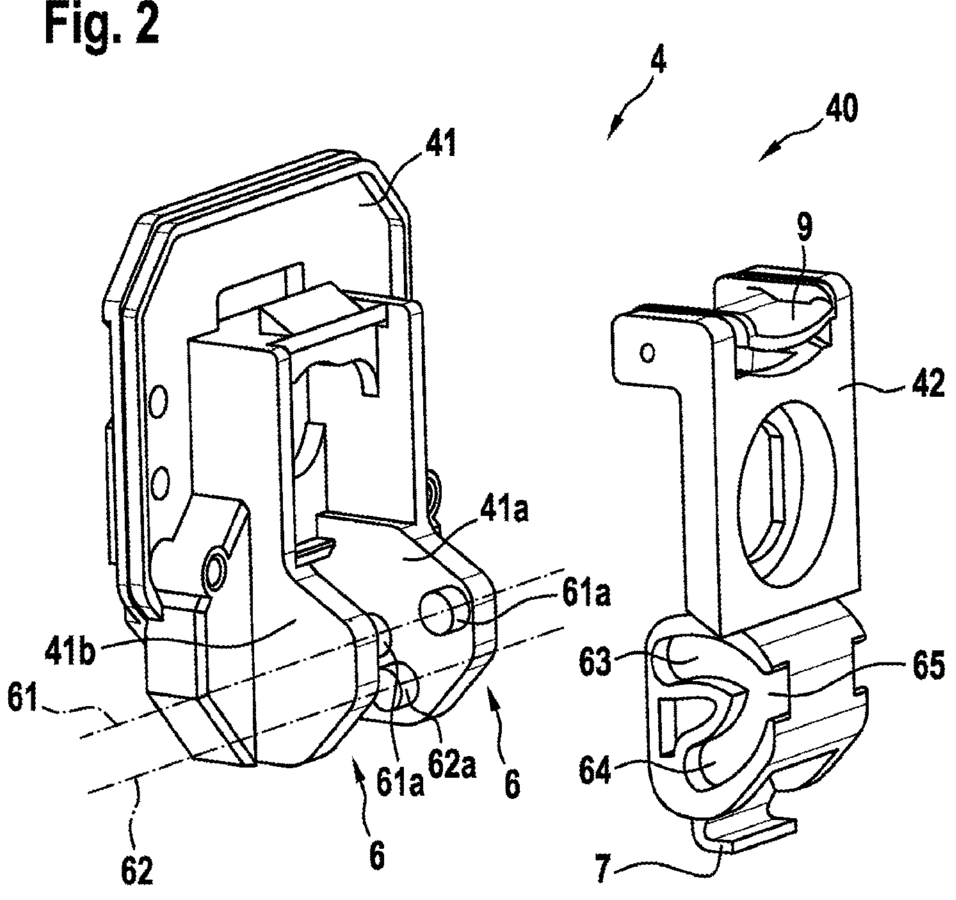
FIG. 2 shows a schematic, perspective exploded view of a locking device according to an exemplary embodiment of the present invention.

As can be seen in the perspective view of FIG. 2, locking device 4 includes a lever system 40, which has a base plate 41 and a lever 42. In addition, lever system 40 includes a shifting link 6, which is developed between base plate 41 and lever 42.

Shifting link 6 has a first bearing axis 61 and a second bearing axis 62. In addition, shifting link 6 has a first curved path 63 and a second curved path 64.

First and second bearing axes 61, 62 are situated in parallel with one another. Shifting link 6 is developed in duplicate on two opposite sides of locking device 4.

Base plate 41 includes a first arm 41*a* and a second arm 41*b*. As may be gathered from FIG. 2, first cylindrical bearing bolts 61*a* and second cylindrical bearing bolts 62*b* are situated on both sides of arms 41*a*, 41*b* so that they are pointing toward each other. Accordingly, a first and second curved path 63, 64 is developed on lever 42 on both sides.

With the aid of shifting link 6, lever 42 is now designed to pivot on base plate 41 in such a way that lever 42 first executes a pivoting motion solely about first bearing axis 61 and subsequently a pivoting motion solely about second bearing axis 62. This is shown in detail in FIGS. 4 and 5.

Figure 3:
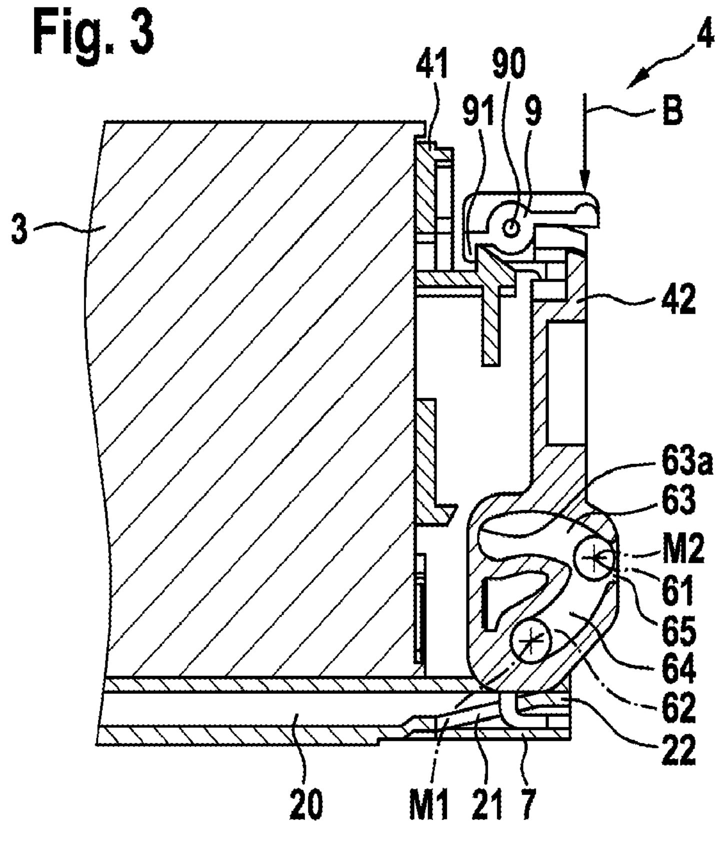
FIG. 3 shows a schematic side view of the locking device from FIG. 2 on an electrical energy store in a latched initial state.

To this end, starting from the locked state that is shown in FIG. 3, a latching device 9 must first be rotated about an axis of rotation 90, for instance using a finger, so that a hook 91 is released from an undercut (arrow B).

Figure 4:
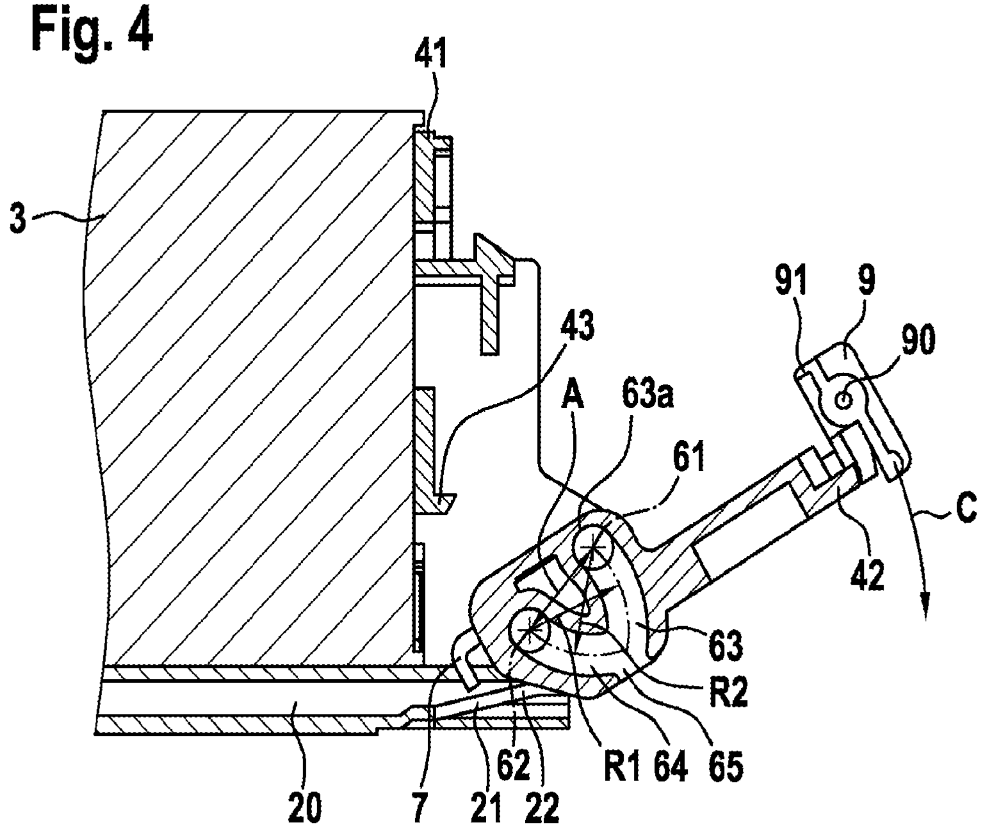
FIG. 4 shows a side view of the locking device in a first opening step.

Next, as illustrated in FIG. 4, lever 42 is rotated about first bearing axis 61 (arrow C). As shown by a comparison of the positions of FIGS. 3 and 4, lever 42 moves along first curved track 63 until it reaches an end stop 63*a* of first curved track 63, which serves as a limit stop. As illustrated in FIG. 4, second bearing axis 62 remains in second curved track 64 without change. In other words, a first pivoting motion occurs solely about first bearing axis 61.

Figure 5:
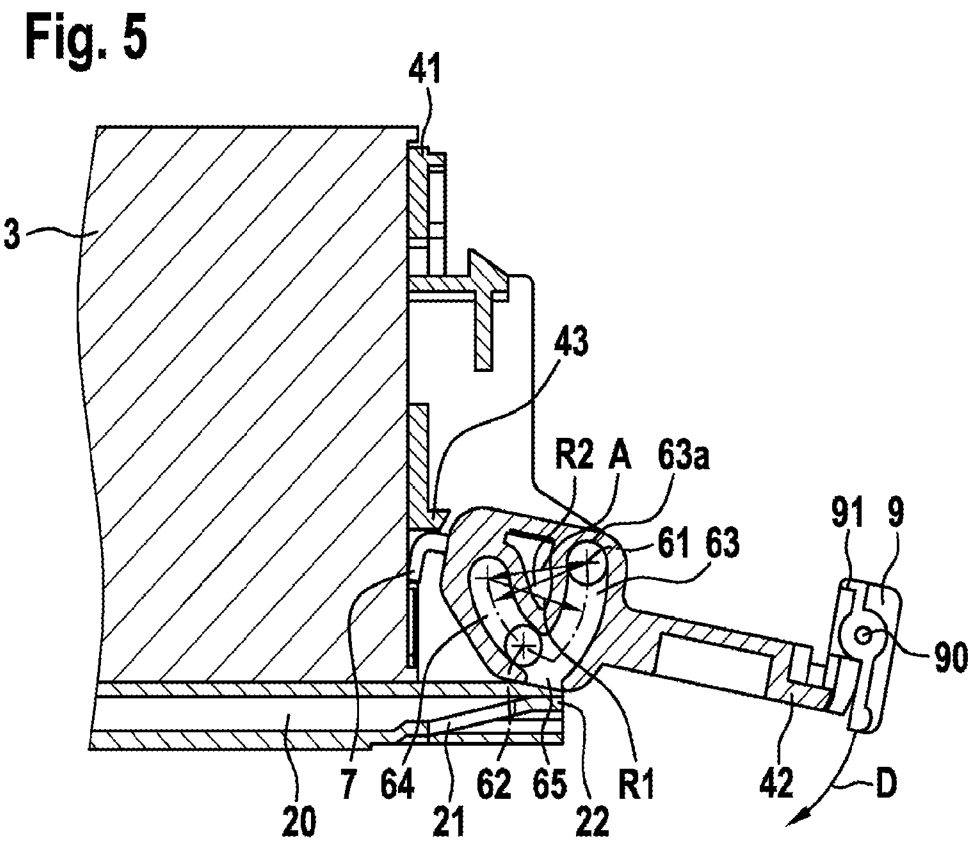
FIG. 5 shows a side view of the locking device in a second opening step.

Starting from the intermediate position in FIG. 4, a second pivoting motion of lever 42 solely about second bearing axis 62 then takes place, which may be gathered from a comparison of FIGS. 4 and 5 (arrow D). FIG. 5 shows an end point of the second pivoting motion. First bearing axis 61 on the cylinder bolts remains in the end position at end stop 63_a_ in first curved track 63 so that the second pivoting motion takes place solely by a relative motion about second bearing axis 62.

A safety element 7 in the form of a hook is provided on lever 42 at one end, and as may be gathered from FIG. 3, safety element 7 engages through an opening 21 in frame tube 20 behind an undercut 22 on frame tube 20. FIG. 3 shows the locked state, latched with the aid of latching device 9, between lever 42 and base plate 41.

Through the first pivoting motion, safety element 7 becomes disengaged from undercut 22 and is unscrewed through opening 21 in frame tube 20 (see FIG. 4).

As may furthermore be gathered from FIG. 5, the second pivoting motion is concluded in that safety element 7 strikes a stop 43 on base plate 41. This is the maximally possible pivoting motion with an installed safety element 7 in this particular exemplary embodiment.

Figure 6:
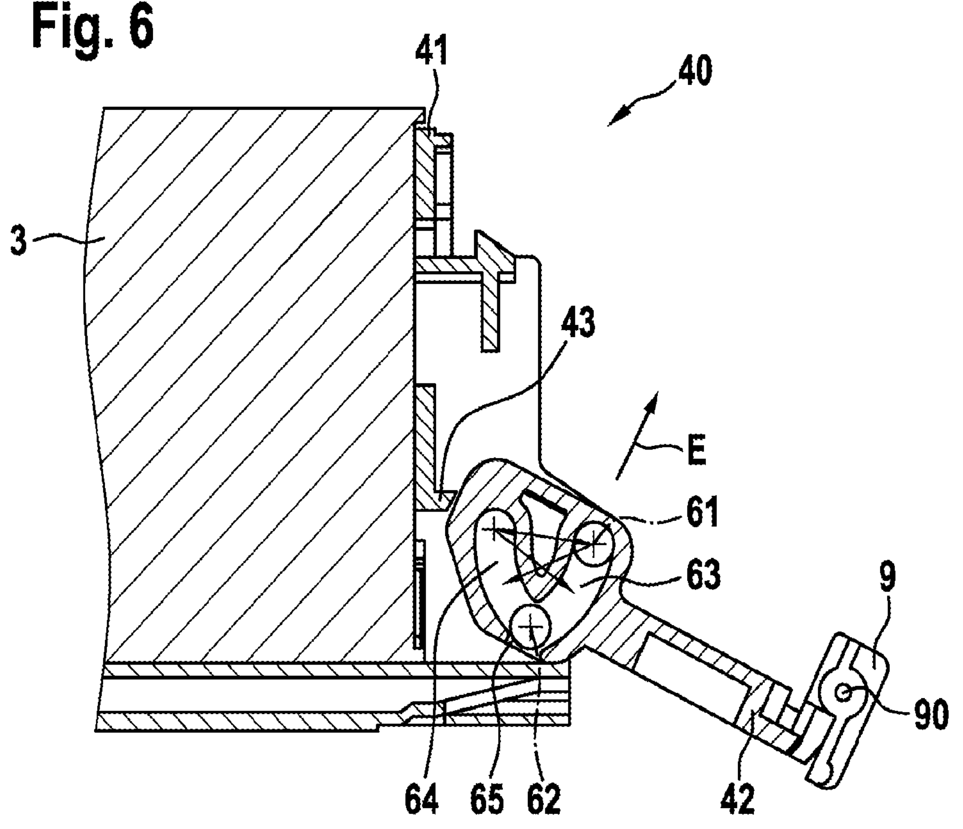
FIG. 6 shows a schematic representation of the locking device for separating a lever from a base plate of the locking device.

As may be gathered from FIG. 6, however, safety element 7 is meant to be removable from lever 42. A separation of lever 42 from base plate 41 is therefore possible as well. To this end, an opening 65 is provided at a point of intersection of first curved track 63 with second curved track 64. As schematically illustrated in FIG. 6, lever 42 may be removed from base plate 41 (arrow E) without safety element 7.

For instance, locking device 4 can be fastened to electrical energy store 3 with the aid of threaded bolts or the like. As an alternative, for example, it is also possible for base plate 41 of locking device 4 to be an integral component of electrical energy store 3, e.g., of a housing of electrical energy store 3.

First curved track 63 has a first radius R1 and is exclusively embodied in the shape of an arc. A center point M1 of first curved track 63 lies in second bearing axis 62. Second curved track 64 is also exclusively developed in the form of an arc having a second radius R2. A center point M2 of second curved track 64 lies in first bearing axis 61. The dimensions of radius R1 and second radius R2 are identical. As a result, a clearance A between first bearing axis 61 and second bearing axis 62 is equal to first radius R1 and equal to second radius R2.

Center point M1 of first curved track 63 thus lies in second curved track 64, and center point M2 of second curved track 64 lies in first curved track 63. The two center points M1, M2 lie in the region of the closed ends of first and second curved tracks 63, 64. The center points of curved tracks 63, 64 then coincide with first bearing axis 61 and second bearing axis 62 when respective cylinder bolts are situated in the end position in first and/or second curved track 63, 64.

In locking device 4, the adept positioning of the shifting link 6 between lever 42 and base plate 41 makes it possible to prevent a joint simultaneous movement about first bearing axis 61 and second bearing axis 62. The entire pivoting motion is subdivided into a first pivoting motion and a second pivoting motion, during which exclusive pivoting about first bearing axis 61 takes place in the first pivoting motion and exclusive pivoting about second bearing axis 62 takes place in the second pivoting motion. This controls a motion of lever 42 relative to base plate 41 in such a way that a minimum of space is required for the motion. In this way, a compact design is achieved, and electrical energy store 3 is able to be integrated into frame tube 20 despite locking device 4.

A collision with other components of two-wheeled vehicle 1 during a movement of lever 42 is therefore able to be avoided.

It should be mentioned that it is naturally also possible to develop shifting link 6 so that the bearing bolts are situated on lever 42 and the curved tracks are situated on base plate 41.

What is claimed is:

1. A locking device for fastening an electrical energy store to a frame or to another component of a two-wheeled vehicle, comprising:

a lever system including a base plate, a lever, and a shifting link between the base plate and the lever, the shifting link having a first bearing axis, a second bearing axis, a first curved track, and a second curved track, the lever being configured to pivot about the base plate using the shifting link so that the lever executes a first pivoting motion solely about the first bearing axis and subsequently executes a second pivoting motion solely about the second bearing axis, wherein the first curved track includes a first end stop that prevents further pivoting about the first bearing axis such that pivoting about the second bearing axis is only possible after the first bearing axis reaches the end stop.

2. The locking device as recited in claim 1, wherein the first curved track and the second curved track intersect at a point of intersection.

3. The locking device as recited in claim 1, wherein the first curved track and the second curved track have an opening.

4. The locking device as recited in claim 1, further comprising a safety element, which is situated on the lever and is configured to secure the locking device in an initial state.

5. The locking device as recited in claim 1, further comprising a stop on the base plate, which restricts a maximum pivoting motion of the lever.

6. The locking device as recited in claim 5, wherein the safety element is configured to strike the stop and to restrict the maximum pivoting movement of the lever.

7. The locking device as recited in claim 1, further comprising: (i) a latching device configured to latch the lever on the base plate in a reversible manner, and/or (ii) a lock configured to secure the lever on the base plate.

8. The locking device as recited in claim 1, wherein the second curved track has a second end stop.

9. A locking device for fastening an electrical energy store to a frame or to another component of a two-wheeled vehicle, comprising:

a lever system including a base plate, a lever, and a shifting link between the base plate and the lever, the shifting link having a first bearing axis, a second bearing axis, a first curved track, and a second curved track, the lever being configured to pivot about the base plate using the shifting link so that the lever executes a first pivoting motion solely about the first bearing axis and subsequently executes a second pivoting motion solely about the second bearing axis, wherein the first curved track and the second curved track are uninterrupted arcs.

10. The locking device as recited in claim 9, wherein a first radius of the first curved track is equal to a second radius of the second curved track.

11. The locking device as recited in claim 10, wherein a clearance between the first bearing axis and the second bearing axis is equal to the first radius and equal to the second radius.

12. The locking device as recited in claim 9, wherein the first curved track has a first end stop and/or the second curved track has a second end stop.

13. A locking device for fastening an electrical energy store to a frame or to another component of a two-wheeled vehicle, comprising:

a lever system including a base plate, a lever, and a shifting link between the base plate and the lever, the shifting link having a first bearing axis, a second bearing axis, a first curved track, and a second curved track, the lever being configured to pivot about the base plate using the shifting link so that the lever executes a first pivoting motion solely about the first bearing axis and subsequently executes a second pivoting motion solely about the second bearing axis; and a safety element, which is situated on the lever and is configured to secure the locking device in an initial state, wherein the safety element situated on the lever is removable from the lever.

14. An electrical energy store of a two-wheeled vehicle having an electric drive, the electrical energy store comprising a locking device configured to fasten the electrical energy store to a frame or to another component of a two-wheeled vehicle, the locking device including:

a lever system including a base plate, a lever, and a shifting link between the base plate and the lever, the shifting link having a first bearing axis, a second bearing axis, a first curved track, and a second curved track, the lever being configured to pivot about the base plate using the shifting link so that the lever executes a first pivoting motion solely about the first bearing axis and subsequently executes a second pivoting motion solely about the second bearing axis, wherein the first curved track includes a first end stop that prevents further pivoting about the first bearing axis such that pivoting about the second bearing axis is only possible after the first bearing axis reaches the end stop.

15. A two-wheeled vehicle having an electrical drive, comprising:

an electrical energy store; and a locking device for fastening the electrical energy store to a frame or to another component of the two-wheeled vehicle, including:

a lever system including a base plate, a lever, and a shifting link between the base plate and the lever, the shifting link having a first bearing axis, a second bearing axis, a first curved track, and a second curved track, the lever being configured to pivot about the base plate using the shifting link so that the lever executes a first pivoting motion solely about the first bearing axis and subsequently executes a second pivoting motion solely about the second bearing axis, wherein the first curved track includes a first end stop that prevents further pivoting about the first bearing axis such that pivoting about the second bearing axis is only possible after the first bearing axis reaches the end stop.

* * * * *